(12) United States Patent
Siegel

(10) Patent No.: US 7,399,117 B2
(45) Date of Patent: Jul. 15, 2008

(54) THIN FILM CALORIMETER

(75) Inventor: Stephen B. Siegel, Chicago, IL (US)

(73) Assignee: Con-Trol-Cure, Inc., Chicago, IL (US)

( * ) Notice: Subject to any disclaimer, the term of this patent is extended or adjusted under 35 U.S.C. 154(b) by 153 days.

(21) Appl. No.: 11/164,910

(22) Filed: Dec. 9, 2005

(65) Prior Publication Data

US 2007/0133652 A1    Jun. 14, 2007

(51) Int. Cl.
*G01K 17/00* (2006.01)
(52) U.S. Cl. .................................................. 374/31
(58) Field of Classification Search ................ 374/31
See application file for complete search history.

(56) References Cited

U.S. PATENT DOCUMENTS

| | | | |
|---|---|---|---|
| 3,871,885 A | | 3/1975 | Hertler et al. |
| 4,171,252 A | * | 10/1979 | Fantazier ..................... 522/61 |
| 6,455,153 B1 | | 9/2002 | Lonc et al. |
| 7,091,254 B2 | | 8/2006 | Crivello |

FOREIGN PATENT DOCUMENTS

GB          2230855    *    4/1989

OTHER PUBLICATIONS

Roper et al, Design and performance of a thin-film calorimeter for quantitative characterization of photopolymerizable systems, Review of Scientific Instruments, 76 (2005).*

Publication: T. M. Roper et al., "Rapid Measurement of Photopolymerization Kinetic Behavior Using a Thin-Film Calorimeter", published by the RadTech International trade show in Charlotte ,North Carolina, May 2-5, 2004.
Todd M. Roper, et al., "In Situ Characterization of Photopolymerizable Systems Using a Thin-Film Calorimeter," published in Macromolecules 2005, 38, 10109-10116, and on the Web on Nov. 4, 2005.

(Continued)

*Primary Examiner*—Gail Verbitsky
*Assistant Examiner*—Megann E Vaughn
(74) *Attorney, Agent, or Firm*—Neal, Gerber, Eisenberg LLP

(57) ABSTRACT

A thin film calorimeter test station can be coupled to a controller in a thin film calorimeter. The thin film calorimeter can comprise a base substrate, a heat flux sensing device mounted on the base substrate, a mask having a hole with a predetermined area positionable above the heat flux sensing device, and a thickness control device for establishing a repeatable precise thickness layer of UV curable sample test material between the mask and the heat flux sensing device. The thin film calorimeter is used to determine several factors of UV curability. A double test platform test station can be provided so that tests at an active test platform and a dummy platform can be performed simultaneously using the same UV light source. Also, the base substrate can be thermally conductive and be mounted on a thermoelectric heater and cooler for controlling the temperature of the test. Furthermore, the base substrate can be mounted on a digital electronic scale whereby a quantity of UV curable sample test material can be weighed, exposed to UV light for a curing test and then a "factor of UV curability" in heat per weight, e.g. joules per gram, can be determined.

32 Claims, 9 Drawing Sheets

OTHER PUBLICATIONS

Takashi Funatsu et al, Time-resolved electron microscopic analysis of the behavior of myosin heads on actin filaments after photolysis of caged ATP. The Journal of Cell Biology. vol. 121, Jun. 1993, p. 1056, left column paragraph 2 and right column paragraph 1.

Notification of Transmittal of International Search Report and Written Option dated Nov. 28, 2007 for PCT Application PCT/US06/61779.

* cited by examiner

THIN FILM CALORIMETER

BACKGROUND OF THE INVENTION

1. Field of the Invention

The present invention is directed to a thin film calorimeter for measuring an exothermic reaction when ultraviolet (UV) light is directed onto a precise thickness and area of a specimen or on a precise weight of a solution, which has monomers and UV photo initiators therein to determine a "factor of curability". The "factor of curability" can be: the peak BTU's per/hour during the curing, the total BTU's generated from the curing, the time to reach the peak BTU per hour or the log of the time to peak temperature divided by the log of the slope of the curve of the time to reach the peak temperature. The UV curable solution can be an ink, a coating or an adhesive.

2. Description of the Related Art

In the curing of inks, coatings and adhesives having photo initiators therein, the monomers and photo initiators are exposed to UV light such as from a mercury vapor light or from UV light emitting diodes (UV LEDs). When this takes place, the monomers and photo initiators are exothermically reacted, cured and polymerized into cross-linked polymers. This exothermic reaction, curing and polymerization often generates significant heat. The light intensity, wavelength of light and duration of the light to achieve complete curing has been studied over the years. Lately, interest in the curability of the ink, coating or adhesive has resulted in the development of techniques for determining or gauging curability to determine the quality and effectiveness of the cure.

One instrument (device) used was a differential scanning calorimeter.

However this instrument is expensive, often costing $75,000.00 or more. More recently the use of a thin film calorimeter has been proposed by T. M. Roper et al. in their paper entitled "Rapid Measurement of Photo-polymerization Kinetic Behavior Using a Thin-Film Calorimeter" published by the RadTech International trade show in Charlotte N.C., May 2-5, 2004. Their initial techniques have been improved upon by Control-Cure Inc. of Chicago, Ill.

Several "factors of UV curability" can be explored. One is the total heat generated. Another is the log of the time to peak temperature divided by the log of the slope of the curve of the time to the peak temperature. Still another is time to peak temperature.

BRIEF SUMMARY OF THE INVENTION

According to the teachings of the present invention, a thin film calorimeter (TFC) is constructed for determining various "factors of UV curability" ("curability factors")of UV curable materials and in particular UV curable inks. While the thin film calorimeter is described below with particular reference to UV curable inks, it is to be understood that the thin film calorimeter can be used to test the curability of other UV curable materials, such as UV curable coatings and UV curable adhesives.

A test station of the thin film calorimeter can include a lower substrate made of phenolic material and fiberglass. On this substrate there can be placed a sandwich of two copper plates, an upper copper plate and a lower copper plate, with a heat flux sensor and a thermocouple sandwiched therebetween. The phenolic material and/or fiberglass is an insulating and very low thermal conductivity material. In some circumstances, it may be desirable to use other electrically and heat conductive metal plates instead of copper plates.

A piece of tape, such as a sheet of box sealing tape, can be placed over the upper copper plate. The tape functions to help keep the upper copper plate clean and simplify the cleaning of the upper copper plate. The tape can be pulled, lifted or peeled off the upper copper plate and discarded after a test, leaving a clean upper copper plate.

The lower substrate can have two spaced apart holes. The spaced apart holes can comprise locating holes for locating a mask/upper substrate, which can have two depending pins on it for being received in the locating holes. The mask/upper substrate can have a cylindrical test hole located between the pins and positioned over the upper copper plate having the tape on it. The cylindrical hole can have an area, such as, of one square centimeter so that, when a curing light is positioned over the mask/upper substrate, the UV light can be directed on the mask/upper substrate to illuminate only the area of ink that is placed on top of the box tape on top of the upper copper plate.

According to one of the teachings of the present invention, UV light is used to cure an area such as a one square centimeter of a UV curable material of a precise thickness of a UV curable monomer mixed with photo initiators which is placed on top of the tape that is on top of the upper copper plate. The present invention teaches techniques for creating reproducible and repeatable test samples of UV curable monomer mixed with photo initiators of precise thicknesses.

One way to create a precise repeatable thickness of UV curable monomer mixed with photo initiators is to put a thickness control device, such as some spacer beads on top of the drop of a UV ink, coating or adhesive and the spacer beads will establish a predetermined thickness so every test will have the same thickness of ink when the test is repeated. Other techniques for creating a precise repeatable thickness of UV curable material include the use of other thickness control devices, such as spacer shims, plastic spacers and a draw down rod.

The thermocouple and heat flux sensor can be coupled to a controller of the thin-film calorimeter. A UV light source such as a UV LED assembly or a UV mercury vapor lamp is placed over the mask/upper substrate. The UV light source can be coupled through a timer in the controller for indicating to the controller when the UV light source is turned on and off.

The UV light source can be turned on through the timer for a predetermined time period such as 30 seconds up to a minute, to cure the precise thickness sample, such as, for example, a precise thickness sample of one square centimeter. The controller can simultaneously electronically detect and measure the peak cure temperature of the UV curable sample material, the time to the peak curing temperature of the UV curable sample material, and the total heat, e.g. total BTUs, for the curing of the UV curable sample material, and can automatically calculate the log of the time to peak curing temperature of the UV curable sample material, divided by the log of the slope of the curve of the time to reach the peak curing temperature of the UV curable sample material, thereby to provide "factors of curability."

According to another teaching of the present invention, the test station can be mounted on a scale which has an output coupled to the controller so that the weight of the test sample can be measured and then the sample is cured. In this embodiment, the provision of a precise thickness of sample is not necessary and only the precise total weight of the sample is required. The same measurements of time to peak temperature, peak temperature and total heat, e.g. total BTUs, for the curing plus a measurement of weight can be made by the controller and then the controller calculates heat per weight, e.g. joules per gram which provides a "factor of UV curability".

According to other teachings of the present invention, there can be provided a small, high intensity, fan cooled, UV mercury lamp assembly with an elongated UV mercury vapor lamp assembly, a liquid light guide and an elliptical or parabolic reflector for providing UV light for the test, a heat test station base for testing at a predetermined temperature, and a dual test station for establishing a measurement of ambient heat at the test station which is not exothermic for subtraction or offsetting from a measurement of combined exothermic heat and ambient heat. Other techniques are provided for eliminating or blocking heat from infrared IR and UV light.

A more detailed explanation of the invention is provided in the following description and appended claims taken in conjunction with the accompanying drawings.

DETAILED DESCRIPTION OF THE INVENTION

The following is a detailed description of the preferred embodiment of the invention and best modes for practicing the invention.

Figure 1:
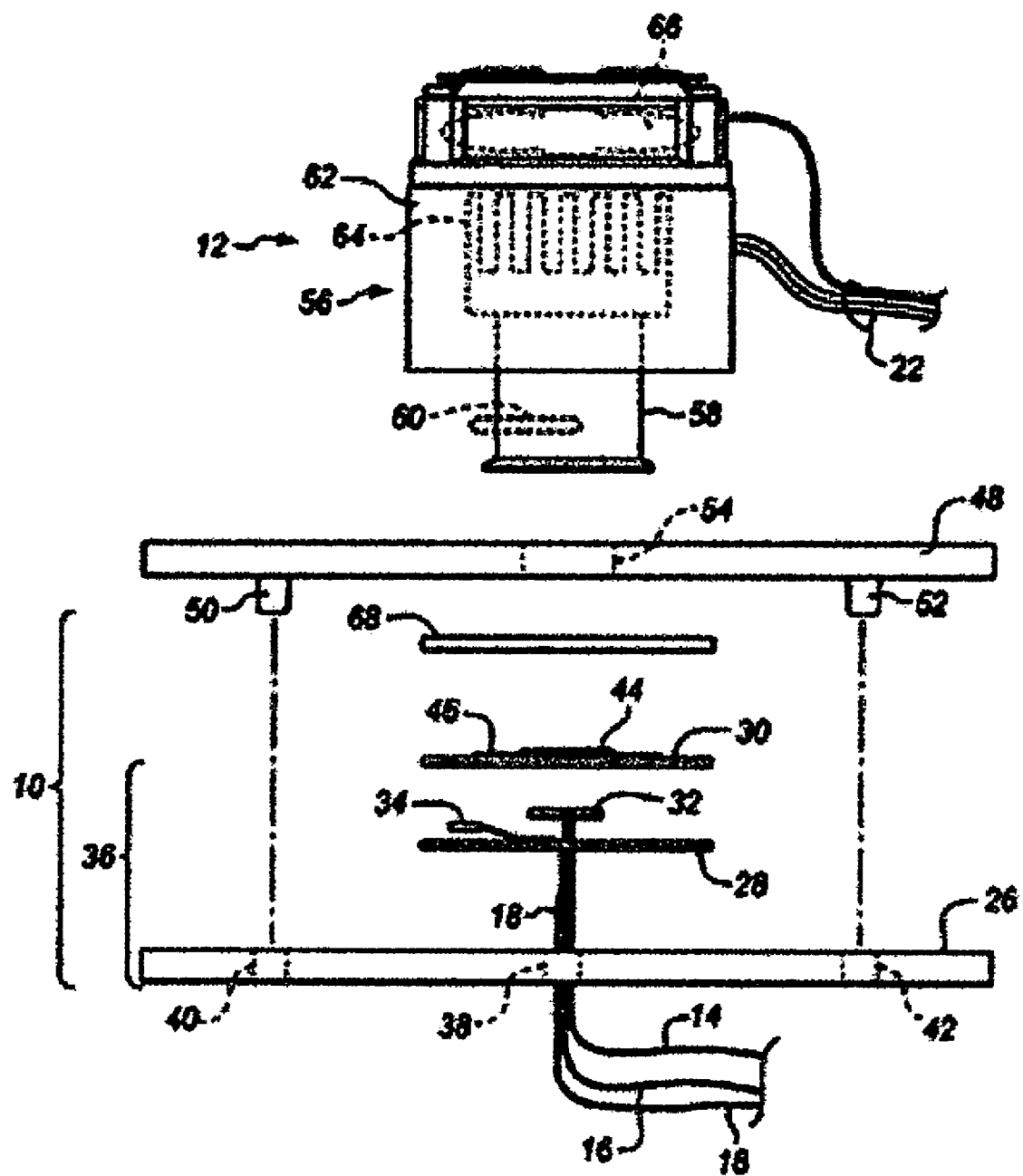
FIG. 1 is an exploded front elevational view of a test station of the thin film calorimeter beneath a UV light source.
Figure 2:
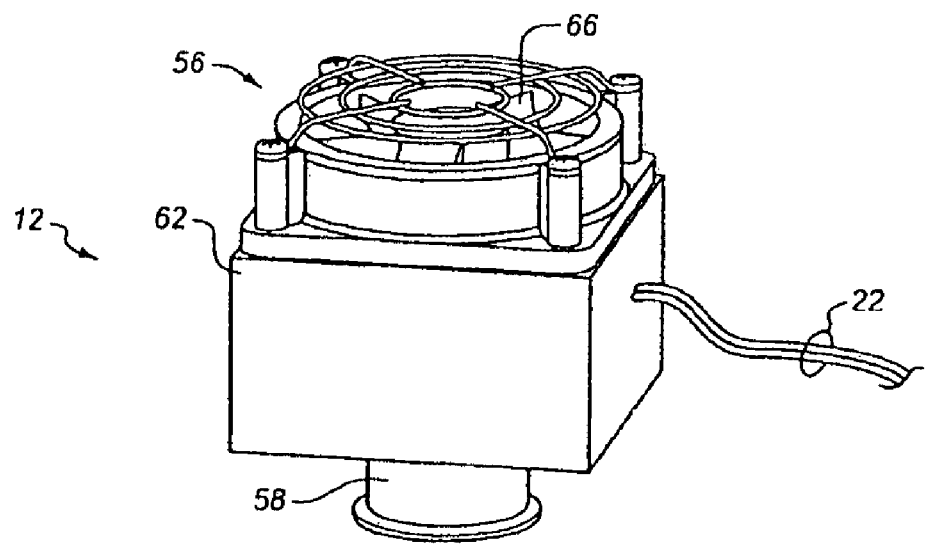
FIG. 2 is an exploded perspective view of the test station and light source shown in FIG. 1.
Figure 2:
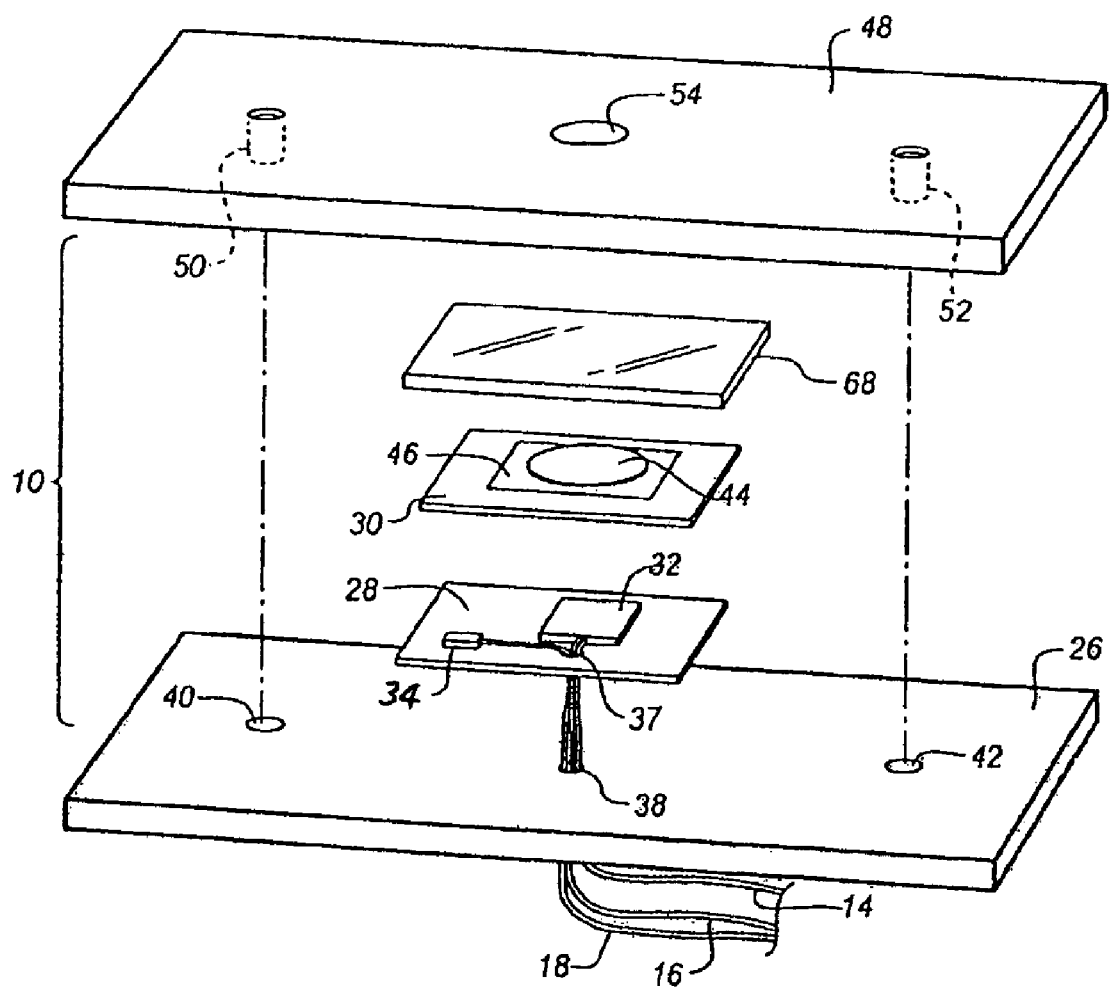

Referring now to the drawings, there is illustrated in FIGS. 1 and 2 an exploded view of a test station 10 with an ultraviolet (UV) light source 12 positioned above the test station 10.

Figure 3:
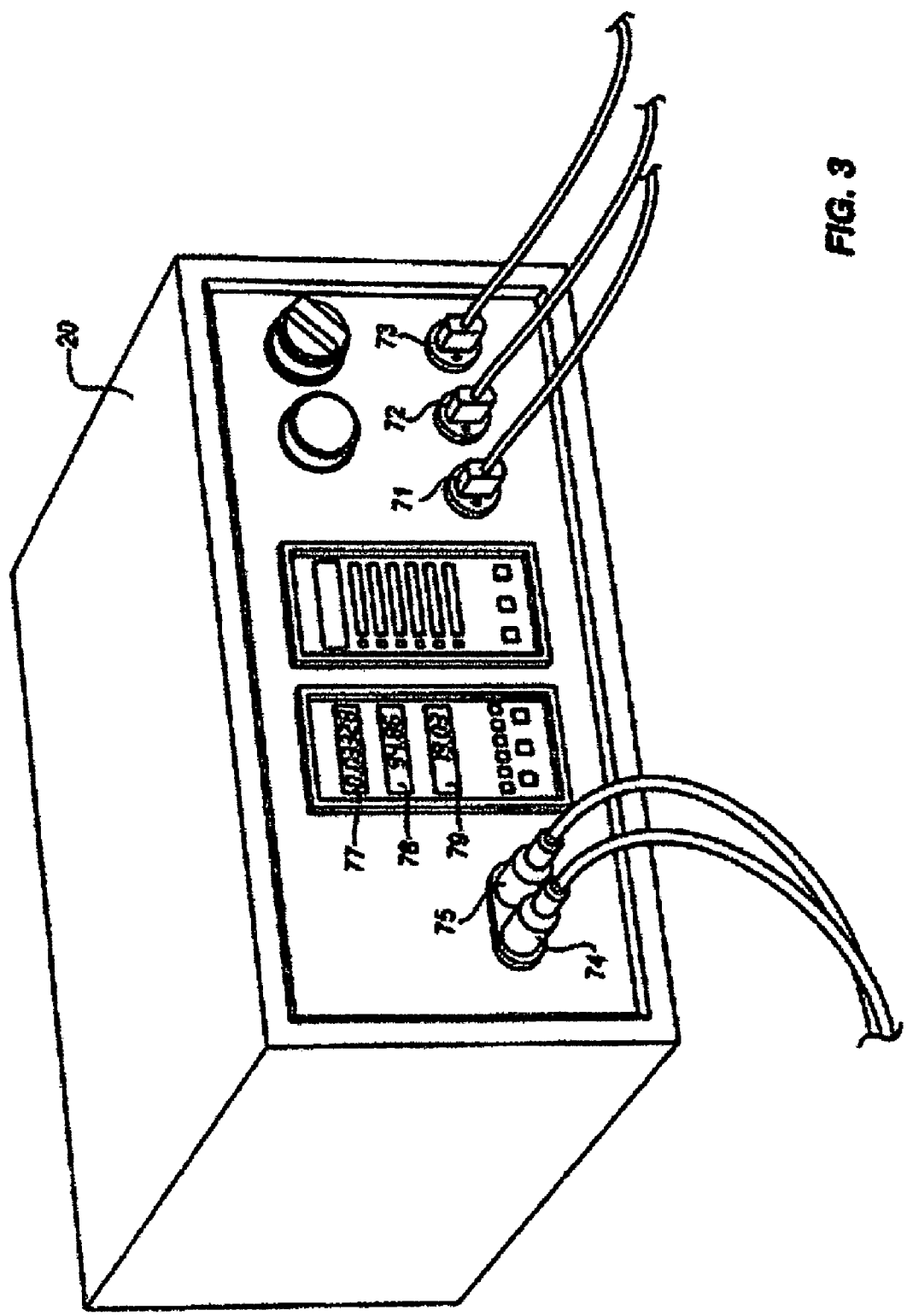
FIG. 3 is a front perspective view of a controller of the thin film calorimeter showing connections from the test station to the controller.

As will be described in greater detail hereinafter, wire conductors 14, 16, 18, (FIGS. 1-2) can extend from the test station 10, to a controller 20 such as shown in FIG. 3. Also, a group of wire conductors 22 (FIGS. 1-2) can extend from the UV light source 12 to the controller 20 and to a timer in the controller 20 for enabling the controller 20 to control the energization, the time of energization, and the cooling of the UV light source 12. In FIG. 2, the wire conductors 14, 16, 18 and 22 are coiled to show that they can be long, such as up to 10 feet or more.

The test station 10 (FIGS. 1-2) include a base substrate 26 which can be made of phenolic material and fiberglass. Fixedly positioned on the base substrate 26 can be a lower metal plate 28 and an upper metal plate 30 with a heat flux sensor 32 providing a heat flux sensing device and a thermocouple 34 sandwiched therebetween. The upper and lower metal plates 28, 30 can be made of an electrical and heat conductive material, such as copper. The heat flux sensor 32 and thermocouple 34 can be secured and fixed between and to the metal plates 28, 30 and to the base substrate 26 to form a test platform 36 of the test station 10. The heat flux sensor 32 can be of the type made by Omega Engineering Inc. of Stanford, Conn. under part no. HFS-3. Further, while shown separately for the sake of illustration, typically the temperature sensing thermocouple 34 is included in the heat flux sensor from Omega Engineering, Inc.

The lower metal plate 28 can have an opening 37 (FIG. 2) therethrough for the wire conductors 14 and 16 from the heat flux sensor 32 and for conductor(s) 18 from the thermocouple 34. The conductors 14, 16 and 18 can also extend through an opening 38 through the base substrate 26 and then to the controller 20 (FIG. 3). The base substrate 26 (FIG. 2) can further have two (2) spaced apart openings 40 and 42 therethrough for receiving locating pins.

In conducting a test of UV curable material, such as UV curable ink, a layer of UV curable ink 44 (FIGS. 1-2) is placed on the upper metal plate 30. However, to facilitate cleaning of the upper metal plate 30, a short strip of tape 46 with adhesive thereon, e.g., box tape, can be taped and removably secured to the upper metal plate 30. A predetermined amount of UV curable ink 44 can be placed on the tape 46.

As will be described in greater detail hereinafter, the thickness of the layer of UV curable ink 44 (FIGS. 1-2) is controlled so that the curing test can be accurately repeated for a layer of UV curable material.

Once an exact, predetermined, thickness layer of UV curable ink 44 or other UV curable material, is established on the short strip of tape 46, a mask or upper substrate 48 which can be made of phenolic material and/or fiberglass and which can have depending, spaced apart, locator pins 50, 52, can be placed over and on the test platform 36 (FIG. 1), with the locator pins 50, 52 received through the spaced apart openings 40, 42 in the base substrate 26. The mask/upper substrate 48 can also have a cylindrical opening 54 therethrough which can be a one (1) square centimeter area so that when UV light is directed through the opening 54, only a fixed amount, such as a one (1) square centimeter amount, of the layer of UV curable ink 44 is cured.

The UV light source 12 (FIGS. 1-2), can be provided by a UV light assembly 56, such as with a lamp housing 58 for a UV mercury vapor lamp 60 mounted in an outer cooling housing 62 which can have mounted therein a heat sink 64 and a fan 66.

Alternatively, a UV light assembly of high intensity UV light emitting diodes (UV LEDs) such as of the type manufactured and sold by NICHIA Corporation of Tokushima Japan under model no.

NLBU21WO1-E1 can be used. The UV light emitting diodes can be mounted in a housing, which can be mounted in an outer cooling jacket, that can be water-cooled or can include a heat sink cooled by a fan.

According to the teachings of the present invention, UV light can be directed for a predetermined time period, e.g., 30 seconds, sufficient to cure the area, e.g. one (1) square centimeter area, of the predetermined thickness layer of UV curable ink 44 for the curing test.

For example, UV light having a wavelength of 375 nanometers can be directed through the cylindrical opening 54 (FIGS. 1-2) for a predetermined time period, for example thirty (30) seconds, and various parameters can be measured from the heat flux sensor 32 by micro-voltmeters in the controller 20 (FIG. 3) and the measured and calculated parameters from the data collected can be displayed on the controller 20. For example in one test, the time to peak heat was 19.03 seconds, the peak heat was 94.96 BTU per hour and the total exothermic heat generated was 0.05338 BTU.

To shield and block ultraviolet (UV) and infrared (IR) heat generated by the UV light source 12 (FIG. 1) from reaching the test platform 36, a quartz glass plate 68 can be fixed to the underside of the mask/upper substrate 48 and the hole 54, e.g., 1 sq. cm hole 54, can be filled with water as a heat insulator.

Figure 13:
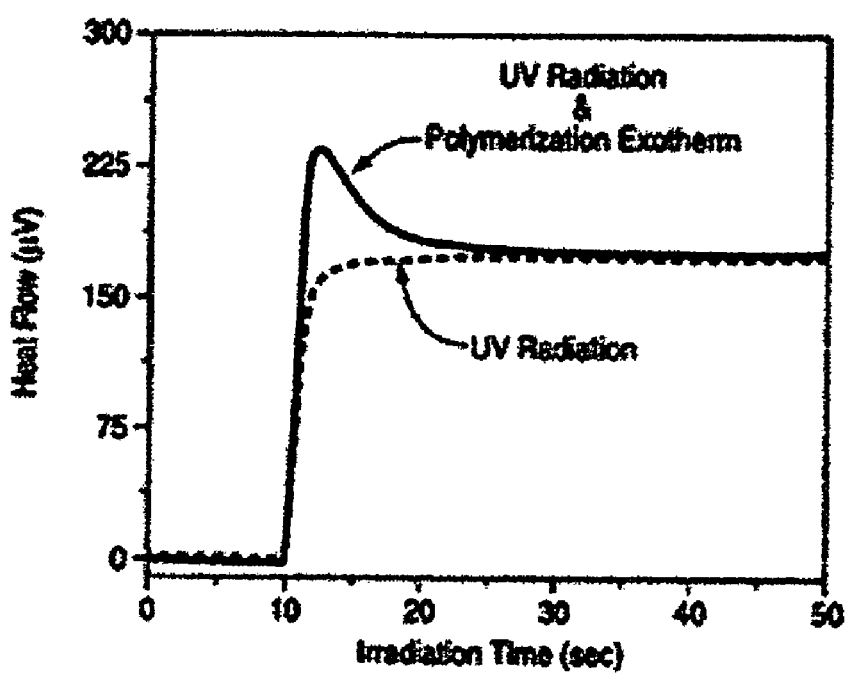
FIG. 13 is a graph of heat flow versus radiation (irradiation) of UV exposure time measured at the active test platform.
Figure 14:
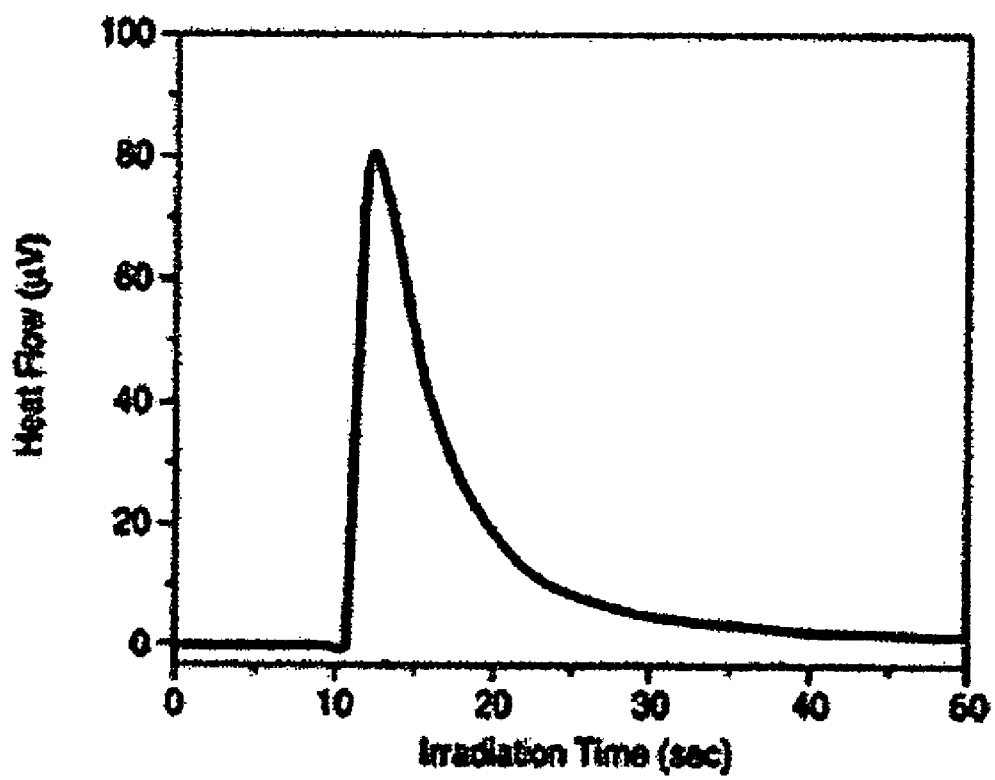
FIG. 14 is a graph of heat flow versus radiation (irradiation) of UV exposure time after the UV radiation (irradiation or exposure) from the dummy test platform is subtracted.

In FIG. 3 is illustrated the controller 20. The controller 20 can simultaneously electronically detect and measure the peak cure temperature of the UV curable sample material, the time to the peak curing temperature of the UV curable sample material, and total heat, e.g. total BTUs, for the curing of the UV curable sample material, and can automatically calculate the log of the time to peak curing temperature of the UV curable sample material, divided by the log of the slope of the curve of the time to reach the peak curing temperature of the UV curable sample material, thereby to provide "factors of UV curability". The controller 20 can be of the type manufactured by Textmate, Inc., located at 995 Park Center Drive, Vista Calif. The controller 20 has input/output ports 71-75 for the wire conductors 14, 16, 18 and 22 (FIGS. 1-2), and displays, such as 77-79 for displaying measured and calculated data, such as log of the time (shown in display 79) to display the peak temperature, as well as the peak temperature divided by the log of the slope of the curve of the time to the peak temperature, such as shown in FIGS. 13-14.

Figure 4:
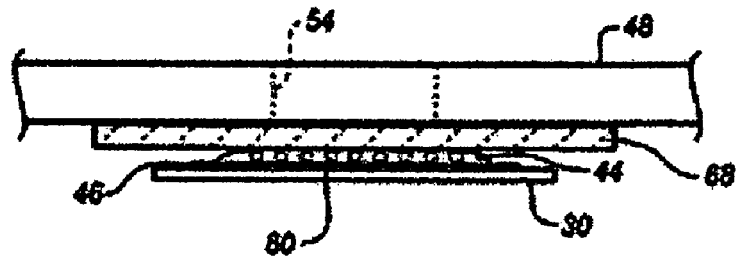
FIG. 4 is an enlarged elevational view of a sample layer of UV curable ink with spacer beads therein between an upper transparent quartz plate and a piece of tape on an upper copper plate at the test station.

FIG. 4 is an enlarged elevational view of the view of the upper metal plate 30, the piece of tape 46, the layer 44 of UV curable ink, and the quartz glass plate 68, which can be a Fischer Scientific 24X×30-112-545-B cover glass. According to one of the teachings of the present invention, to obtain a precise repeatable thickness of the layer 44 of UV curable ink or other material, 5 to 25 small glass beads 80, such as IX 0.0029 inch diameter beads, which can be obtained from Potter Industries, Inc. of 350 North Baker Drive, Canby, Oreg., are mixed into the layer 44 of the UV curable ink. The mask/upper substrate 48 and the cover glass 68 can be oscillated on or pressed down on the layer of UV curable ink to ensure a precise thickness of the layer 44 of UV curable ink. While the beads 80 take up some space in the sample of UV curable material being tested, their volume is so small, i.e., approximately a dozen beads, that their inclusion in the sample of UV curable material does not adversely affect the test for a "factor of UV curability".

Figure 5:
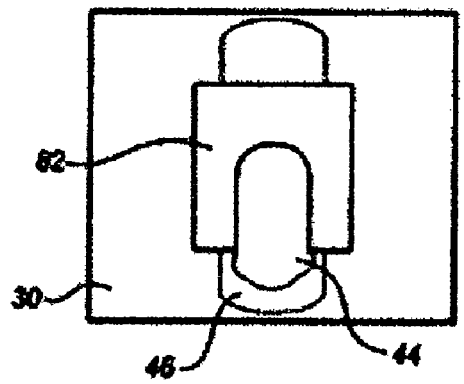
FIG. 5 is a top plan view of a shim spacer positioned above a piece of tape on an upper copper plate.
Figure 6:
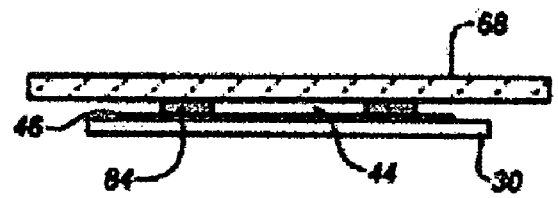
FIG. 6 is a sectional view of the upper quartz plate and UV curable material in a cutout on a shim plate positioned on a piece of tape on an upper copper plate.

Alternatively, a slotted metal shim 82 (FIG. 5), such as an aluminum shim, or a flat plastic ring or washer 84 (FIG. 6) such as made of polytetraflouride ethylene (PTFE) or Teflon™ can be used to establish a precise, repeatable thickness layer 44, as shown in FIGS. 5 and 6. The shim 82 or ring 84 can be placed on the strip of tape 46 and UV curable ink and placed in the hole or opening in the shim 82 or ring 84. Then the mask/upper substrate 48 (FIG. 4) and the cover glass 68 can be oscillated or pressed on the layer to ensure a precise thickness of the layer 44 of UV curable ink.

Figure 7:
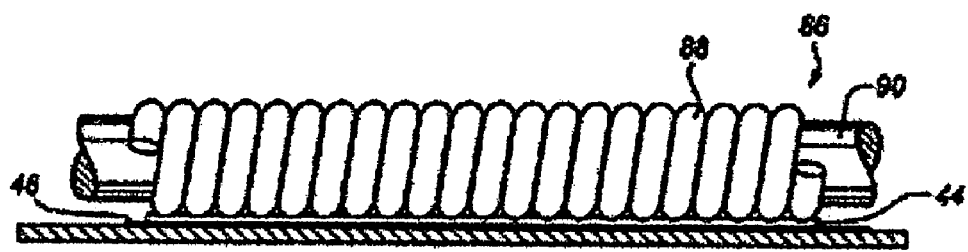
FIG. 7 is a side view of a wire-wound rod forming a draw down rod for creating a uniform thickness layer of UV coating on a substrate such as the piece of tape.
Figure 8:
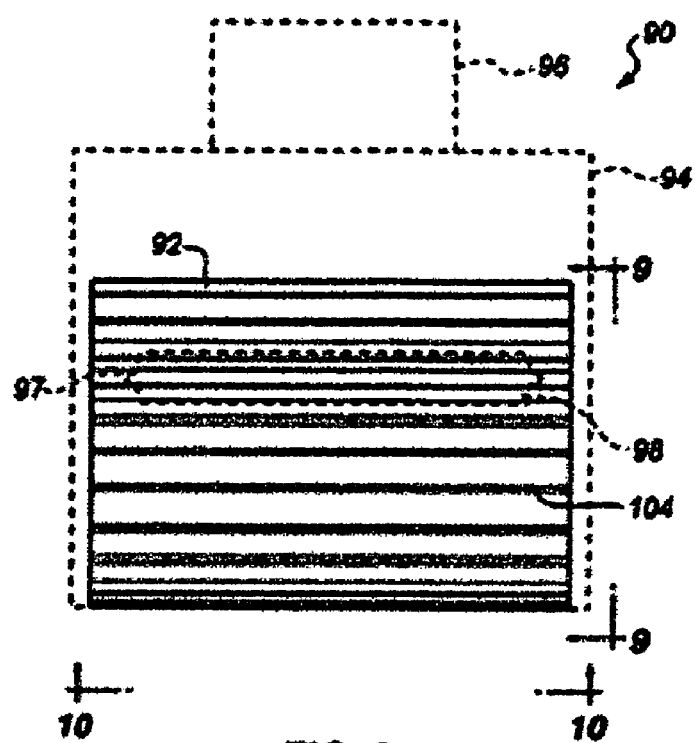
FIG. 8 is a side elevational view of a housing, shown in phantom or dotted line, about a UV mercury lamp and parabolic or elliptical reflective shield.

Another technique for creating a precise thickness layer 44 of UV curable material is to use a draw down rod 86 which is a wire 88 wound rod 90 as shown in FIG. 7. The diameter of the wire 88 determines the thickness of the layer 44 of the UV ink when the draw down rod is moved through a small amount of UV ink placed on the strip of tape 46. The same thickness of the layer 44 is obtained each time a clean draw down rod 86 is moved through a small amount of UV ink. The mask/upper substrate 48 (FIGS. 1-2) and cover glass 68 are placed on the strip of tape 46. The metal plate 30 can be pressed down, and the hole 54 exposed to or irradiated (radiated) with UV light. Thereafter, a measurement of the exothermic heat generated by the curing of a precise thickness of the UV curable ink or other UV curable material can be made as previously explained.

Figure 9:
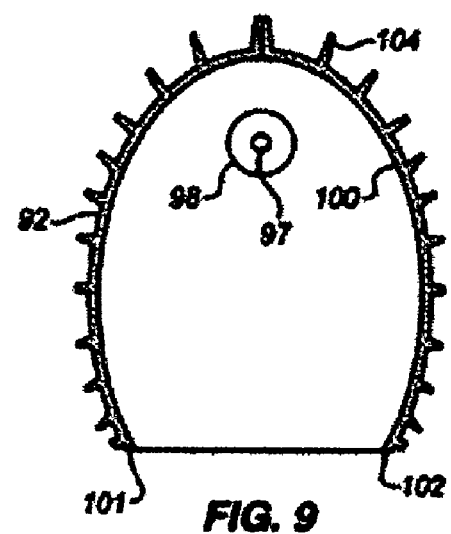
FIG. 9 is an end view of a parabolic or elliptical reflector used with a liquid light guide for receiving UV light from a mercury vapor lamp.
Figure 10:
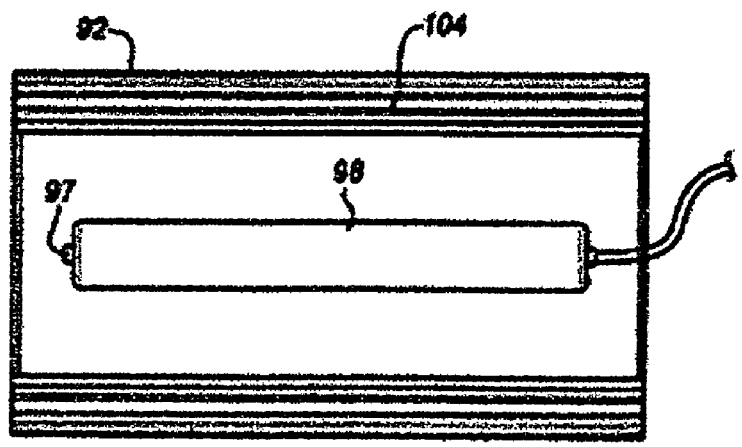
FIG. 10 is a bottom view taken along 10-10 of FIG. 8 of the parabolic or elliptical reflector showing an elongate liquid light guide therein.

FIG'S. 8-10 show an elongated UV light source 90, which can include a lower UV light reflector 92, an upper cooling housing 94 and a fan 96 for cooling. The housing 94 can contain and mount a UV mercury vapor lamp 97 which can be connected to a liquid light guide 98 mounted in the reflector 92. The reflector 92 can have a parabolic or elliptical reflecting surface 100 (FIG. 9) for directing UV light onto a test station. The lower ends 101 and 102 (FIG. 9) of the elliptical reflector can curve inwardly so that the UV light is directed only to the test station. Also the reflector 92 can have heat-dissipating fins 104 to assist in cooling the reflector 92.

Figure 11:
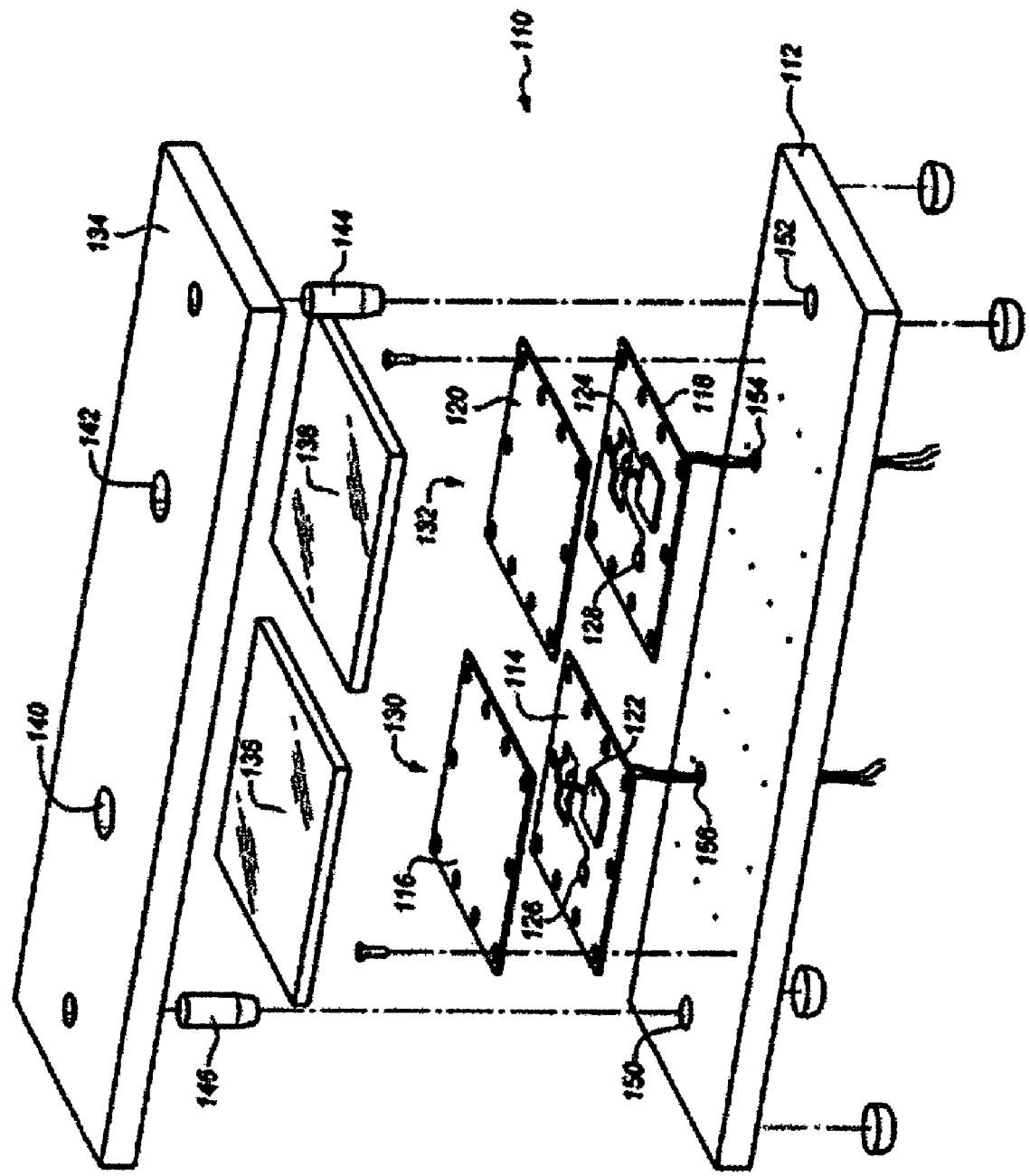
FIG. 11 is an exploded view of a double test platform test station having an active test platform and a dummy test platform so that the heat flux at the dummy test platform can be measured and subtracted from the heat flux at the active test platform and which can be used to provide the data for the graph shown in FIG. 14.

The UV light source 90 can be used with a double test platform test station 110 shown in FIG. 11. The double test platform test station 110, can include a base substrate 112 with two pairs of lower and upper metal plates 114, 116 and 118, 120 made of an electrical and heat conductive material, such as copper. Heat flux sensors 122, 124 can be positioned between each pair of plates 114, 116 or 118, 120 as well as between thermocouples 126 or 128, respectively, thereby to form double test platforms 130 and 132. The first test platform 130 can be referred to as the active test station and the second test platform 132 can be referred to as the dummy test station. An elongate mask/upper substrate 134 be can provided, preferably above two transparent clear quartz glass plates 136 and 138. The mask/upper substrate 134 can have two holes 140 and 142, and two spaced apart depending locating pins 144 and 146, which can be received in locating holes 150 and 152 in the lower base substrate 112. The base substrate can also have holes 154 and 156 beneath the lower metal plates 114 and 118 for receiving wire conductors from the heat flux sensors 122 and 124 and thermocouples 126 and 128.

In using the double test platform test station 110, a layer of UV curable material such as UV curable ink can be placed on a piece of tape and then placed on the upper metal plate 116 of the active test platform. Nothing is placed on the dummy test platform. Then UV light, such as from a UV light source as previously described, can be directed through the two holes 140 and 142 of the elongated mask/upper substrate. The holes 140 and 142 can be filled with water.

The controller measures two tests. The heat flux sensed through the two metal plates 120 and 118 without test material is subtracted from the heat flux sensed through the two metal plates 116 and 114 with test material thereon to obtain the heat generated by the curing polymer alone and cured by the UV light from the UV light source 90 without the ambient, IR and UV heat which are subtracted out.

Figure 12:
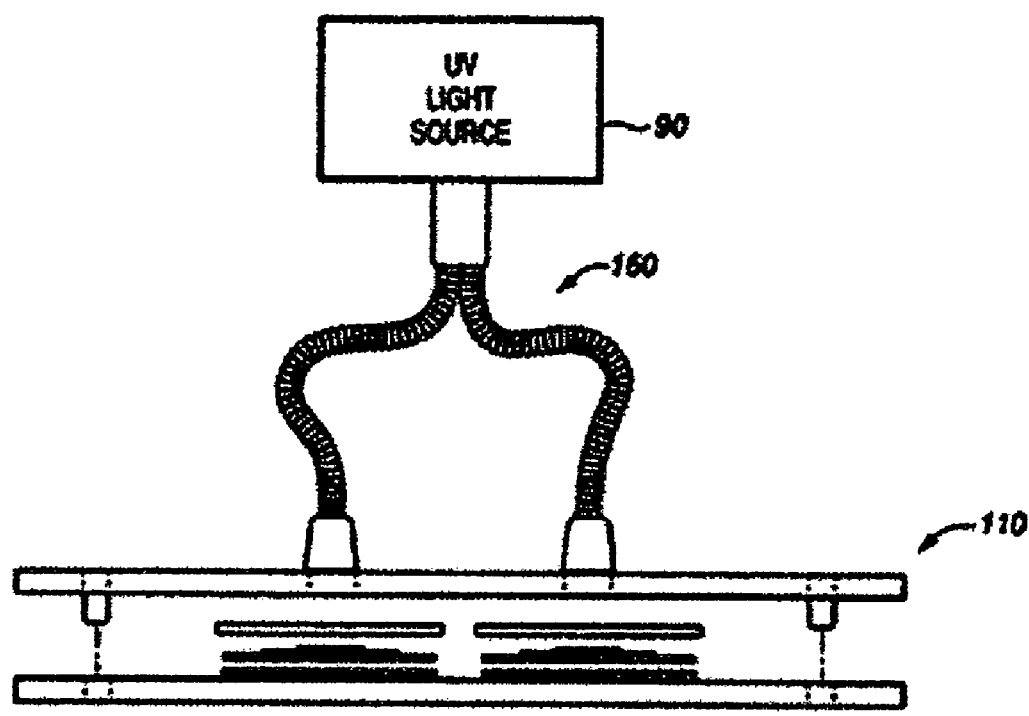
FIG. 12 is a plan view of the double test station the active test platform and the dummy test platform for receiving UV light from a single light source via a light splitting liquid light guide.

As shown in FIG. 12, a bifurcated liquid light guide 160 can be used to create two legs or streams of UV light from the UV light source 90 which is then positioned a short distance from the test station 110 to minimize the IR and UV heat directed onto the test station 110.

A graph of the heat generated from the active test station 130 (FIG. 11) is shown in FIG. 13 and a graph of the exothermic heat when the heat from dummy test platform 132 (FIG. 11) is subtracted from the heat from the active test station 130 is shown in FIG. 14.

Use of the double test platform test station 110 saves time and improves accuracy over sequential or separate active and dummy test measurements.

Figure 15:
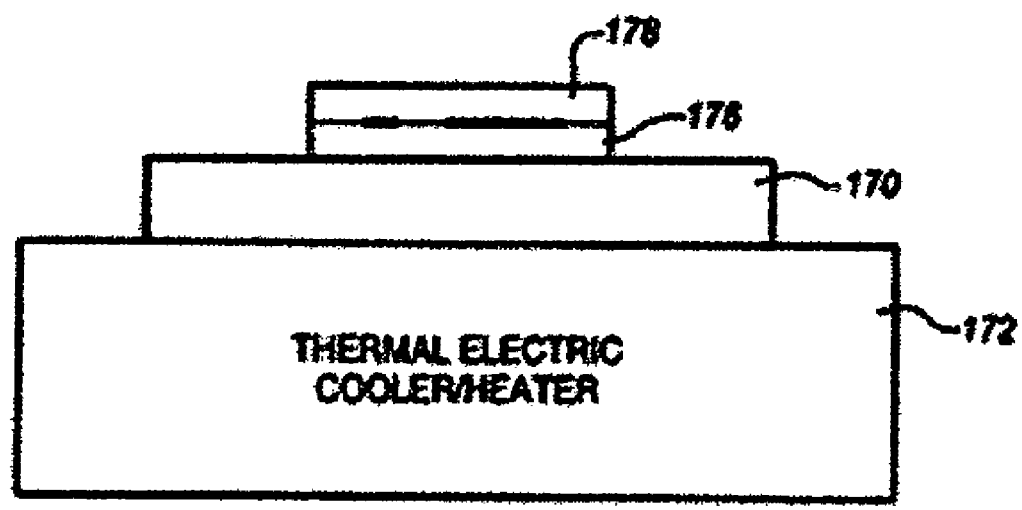
FIG. 15 is a front elevational view of the base substrate of the test station mounted on a thermoelectric cooler.

At times one will want to measure the heat flux of a UV curing material, which is cured at a temperature other than ambient temperature such as at a lower temperature or at a higher temperature, e.g., at 160° F. For a test at a temperature other than ambient, a metal base plate 170 (FIG. 15) such as an aluminum base plate can be mounted on top of a thermal electric cooler/heater 172 which can control the temperature of the metal base plate. On top of the temperature controlled base plate 170 can be mounted two metal plates 176, 178 made of an electrical and heat conductive material such as copper. Positioned between the metal plates, 176, 178 can be a heat flux sensor and a thermocouple for measuring the temperature.

Once the temperature of the base plate 170 (FIG. 15) is at the desired operating temperature which, is also preferably the equilibrium temperature of the upper metal plate 178, a piece or strip of removable detachable tape having the test ink thereon can be placed on the upper metal plate 178. Either a UV LED assembly or a UV mercury vapor lamp can be used to direct UV light to a test hole in a mask/upper substrate placed over the upper metal plate 178.

Figure 16:
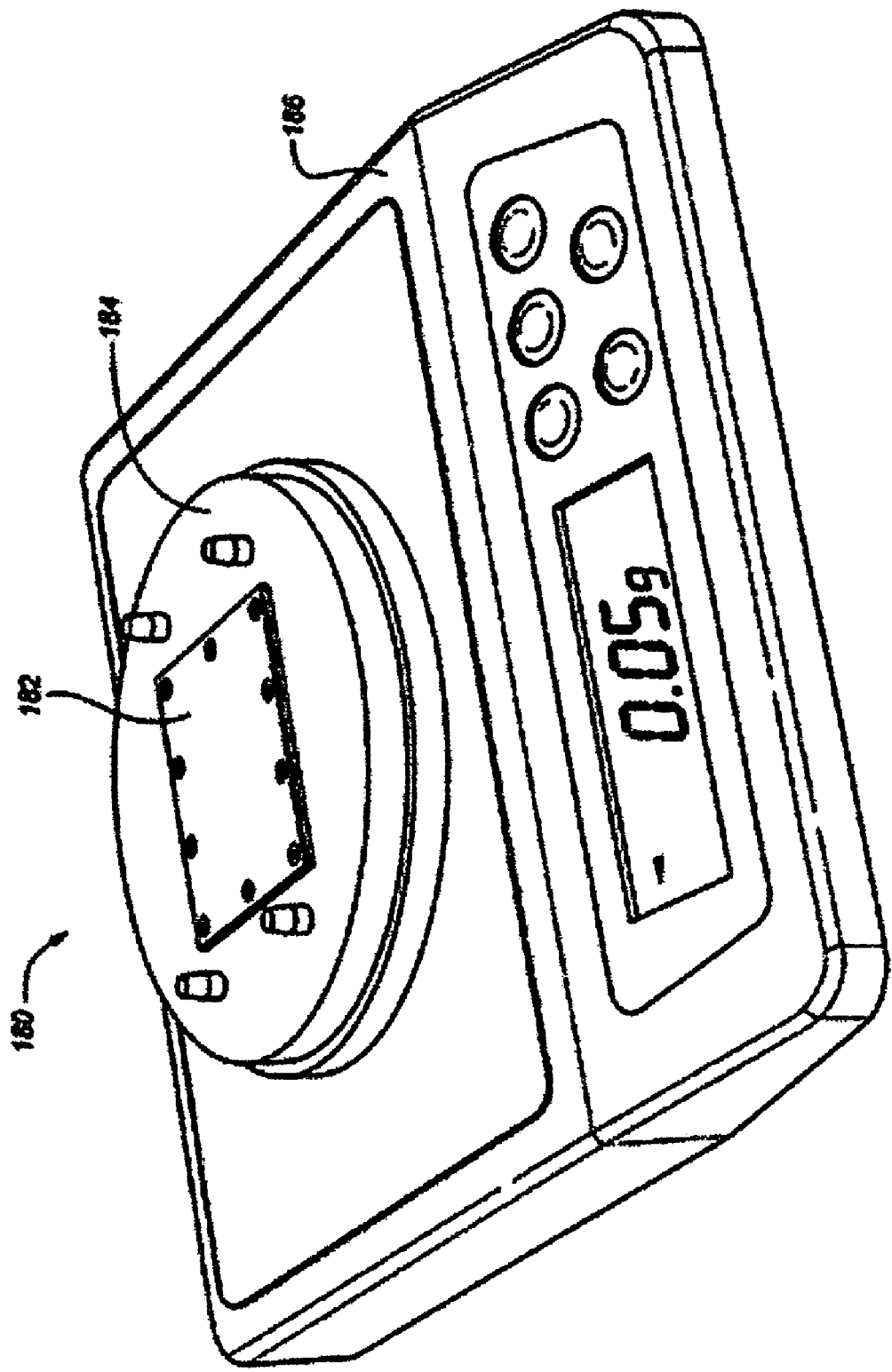
FIG. 16 is a perspective view of the base substrate of a test station supported on an electronic digital scale whereby a sample layer of UV curing material can be placed on a piece of tape on top of the copper plate at the test station and then exposed or irradiated (radiated) with UV light and the weight of the sample as well as the parameters of the test are transmitted to the controller so that a readout in joules per gram can be obtained without controlling the thickness of the layer of the sample.

A "factor of UV curability" which is not dependent on thickness can be measured in joules per gram. Such a "factor of UV curability" can be obtained by weighing the sample being tested while the controller 20 determines the watts per meter squared per second based on the weight of the test sample. This can be achieved by placing the test sample on a test platform 180 such as shown in FIG. 16. The test platform 180 can include a strip or piece of tape on a sandwich 182 of metal plates with a heat flux sensor therebetween. A base substrate 184 can be positioned on an electronic digital scale 186 to support the sandwich of metal plates. The scale 186 can be first zeroed by weighing the test platform 180 without the test sample thereon. Then, an amount of UV curable material can be placed on the piece of tape and an exact measurement of the weight of UV curable material is made Then, UV light, such as from a UV light source as previously described is applied to the sample. The cured sample can be weighed on the scale and measurements and data can be determined and processed by the controller 20. A read out of heat per weight e.g., joules per gram can be obtained. The heat per weight e.g., joules per gram can indicate a factor of curability of the sample of UV curable material with photo initiators therein.

The thin film calorimeter can be used to test UV curable inks when they are first received by a printer. The tester (user) first finds out what the "factor of UV curability" is and then the user/operator checks periodically to see if the "factor of UV curability" has changed. If it has, the user/operator can change other parameters such as the UV light intensity or the time the UV light is applied to the ink or the speed at which the ink on the paper goes past the UV light.

With the thin film calorimeter described above, one can establish a "factor of UV curability" or a "base line" for a UV curable ink for a printer. The user/operator can use that "base line" figure to determine when the user/operator would need to get a new batch of UV curable ink.

It is preferred to obtain a "base line" for a first batch of UV curable ink to compare with subsequent batches of UV curable ink. If the new batch has a lower factor of curability, then the operator knows the user/operator will have to do something with his curing process parameters, e.g., lower them or raise them, to obtain a similar quality cure and polymerization as the first batch of UV curable ink.

Another scenario can be where a "base line" for a batch of UV curable ink is developed and then the user/operator puts the left-over remaining UV curable ink on a shelf for six months or so. Then a new order comes in and the operator wants to determine if the remaining UV curable ink has the same "base line" over six months of aging and, if it doesn't, the user/operator has to determine if the user/operator wants to throw it out or simply adjust the user's/operator's printing parameters to accommodate for the change in the "base line" i.e., the different curability of the aged ink.

While reference has been made to UV curable printing inks, other types of UV curable coatings and UV curable adhesives can be tested to determine its factor of UV curability.

Another scenario would be where a user of a UV curable material, such as a UV curable coating or UV curable adhesive, wants to control its flowability. If the user/operator adds a flow agent, it is possible that the flow agent can affect the curability. Once a flow agent is added to adjust the flow characteristics, it is desirable to determine what the factor of UV curability is now for the UV curable material with altered flow characteristics. In this scenario, a "base line" for the UV curable material is determined. Then a "base line" for the UV curable material with altered flow characteristic is determined and compared with the original UV curable material to determine if the new "base line" "factor of UV curability" is within a desired range and whether UV light parameters or operating conditions have to be altered.

Another modification is to provide long wires, e.g. ten foot long wires, as shown by the coiled wire conductors 14-18 in FIG. 2, from the heat flux sensor 32 to the controller 20 (FIG. 3). Instead of using a test UV LED lamp or a test mercury vapor lamp, the user can use a production lamp curing system by placing the test structure and sample on a conveyor that has the UV production lamp curing system to test and determine the UV curability for the UV production lamp system in order to obtain an actual performance profile, factor of curability and base line.

From the foregoing description, it will be apparent that the method and thin-film calorimeter of the present invention have a number of advantages, some of which have been described above and others of which are inherent in the invention and examples.

Although embodiments of the invention have been shown and described, it will be understood that various modifications and substitutions, as well as rearrangements of components, parts, equipment, apparatus, process (method) steps, and uses thereof, can be made by those skilled in the art without departing from the teachings of the invention. Accordingly, the scope of the invention is only to be limited as necessitated by the accompanying claims.

What is claimed is:

1. A method for measuring a factor of ultraviolet (UV) curability of a UV curable material, comprising the steps of:
    establishing a precise thickness of UV curable material by placing a thickness control device in a test area on a surface of a heat flux sensing device;
    providing an insulating panel, wherein the heat flux sensing device is mounted on the insulating panel;
    placing the UV curable material in, about or on the thickness control device;
    flattening the UV curable material to the thickness of the thickness control device;
    placing a mask defining a hole with a predetermined area over the test area;
    directing UV light through the hole onto the flattened UV curable material beneath the hole in the mask for a predetermined time period to cure the flattened UV curable material; while
    measuring (1) the peak temperature generated by the exothermic reaction that takes place during curing of the flattened UV curable material, (2) the time to peak curing temperature of the flattened UV curable material; and (3) the total heat generated by the exothermic reaction that takes place during curing of the flattened UV curable material.

2. The method of claim 1 wherein the thickness control device comprises 5-25 glass beads with a diameter between 0.0015 inches and 0.010 inches which are mixed in the UV curable material.

3. The method of claim 1 including the step of placing a transparent glass plate beneath the hole in the mask and above the layer of UV curable material being tested.

4. The method of claim 3 including the step of placing water in the hole to filter out infrared (IR) and (UV) ultraviolet heat in the UV light transmitted through the water to the UV curable material being tested.

5. The method of claim 1 including the step of placing a piece of tape on the surface of the heat flux sensing device and then placing the UV curable material on the piece of tape followed by flattening the UV curable material to a repeatable precise thickness, whereby the piece of tape facilitates cleaning of the surface of the heat flux sensing device.

6. The method of claim 1 wherein said insulating panel comprises a phenolic material and/or fiberglass.

7. The method of claim 1 wherein said heat flux sensing device comprises a lower metal plate and an upper metal plate with a thermocouple and a heat flux sensor sandwiched therebetween.

8. The method of claim 1 including:
    simultaneously conducting a test at a dummy test station wherein UV light from the same UV light source is directed through a similar hole through the mask having similar predetermined area onto a similar second heat flux sensing device for a similar predetermined time period;
    measuring the heat flux through the second heat measuring device;
    subtracting the heat flux measured at the dummy test station from the heat flux measured at the active test station where the exothermic reaction from the curing of the UV curable material occurs; and
    automatically determining only the heat flux from the exothermic reaction that occurred during curing of the precise thickness layer of UV curable material.

9. The method of claim 8 including the step of channeling the UV light through a bifurcated liquid light guide to two holes of predetermined area in the mask to isolate the heat flux sensing devices from heat generated by the UV light source.

10. A method of claim 1 including:
    measuring a UV curability factor in heat per weight e.g., joules per gram, from UV curable material which is cured at a test station;
    providing an electronic digital scale;
    zeroing the scale with a test platform placed thereon, said test platform comprising a substrate and upper and lower metal plates with a thermocouple and a heat flux sensor sandwiched between the metal plates;
    placing an amount of UV curable material on the upper metal plate;
    measuring the weight of the amount of UV curable material placed on the upper metal plate of the heat flux sensing device;
    exposing the UV curable material with UV light for a predetermined time period;
    electronically measuring the heat flux through the heat flux sensing device;
    electronically measuring the power per area per time, e.g. watts per meter squared per second; and
    electronically determining the heat per weight e.g., joules per gram, from the exothermic reaction that takes place during the curing of the UV curable material as a factor of UV curability.

11. A thin film calorimeter for automatically determining a factor of ultraviolet (UV) curability of a UV curable sample test material, comprising:
    a controller for electronically and automatically determining a peak curing temperature of the UV curable sample material, the time to reach the peak curing temperature of the UV curable sample material, and/or the total heat to cure the UV curable sample material;
    a thin film calorimeter test station coupled to the controller, the test station comprising:
    a base substrate having thermal insulating properties;
    a heat flux sensing device mounted on the base substrate,
    a mask defining a hole with a predetermined area positioned above the heat flux sensing device,
    a thickness control device for establishing a repeatable precise thickness layer of UV curable sample test material between the mask and the heat flux sensing device; and
    said UV curable sample test material selected from the group consisting of UV curable inks, a UV curable coating, and a UV curable adhesive.

12. The thin film calorimeter of claim 11 wherein the thickness control device comprises small beads positioned in the UV curable sample test material.

13. The thin film calorimeter of claim 12 wherein said small beads comprises 5-25 glass beads with a diameter between 0.0015 inches and 0.010 inches.

14. The thin film calorimeter of claim 11 including a transparent glass plate located beneath the hole in the mask and above the layer of UV curable material being tested.

15. The thin film calorimeter of claim 11 wherein the thickness control device is a shim comprising a spacer with an open area in which the UV test material is placed and flattened out to the thickness of the shim.

16. The thin film calorimeter of claim 11 wherein the thickness control device is an annular washer having an opening defining a cutout area whereby UV curable sample test material can be placed in the opening of the washer and excess UV curable sample test material can be squeezed out through the cutout in the washer.

17. The thin film calorimeter test of claim 16 where said washer comprises polytetrafluoroethylene.

18. The thin film calorimeter of claim 11 wherein the thickness control device is a drawn down rod including a wire coil on a rod which is moved through the UV curable material and the thickness of the UV curable sample test material is determined by the diameter of the wire wound around the rod in the drawn down rod.

19. The thin film calorimeter of claim 11 wherein a strip of removable tape is placed on the heat flux sensing device to carry the UV curable sample test material and to facilitate cleaning of the heat flux sensing device.

20. The thin film calorimeter of claim 11 wherein said heat flux sensing device comprises:
   a lower metal plate;
   an upper metal plate;
   a thermocouple operatively positioned between the lower and upper metal plates; and
   a heat flux sensor operatively positioned between the lower and upper metal plates and connected to said thermocouple and to said lower and upper metal plates.

21. The thin film calorimeter of claim 11 including:
   a metal base plate for supporting said heat flux sensing device; and
   a thermoelectric cooler for supporting said metal base plate to cool or heat the metal base plate to control the temperature at which the UV curable sample test material will be cured.

22. The thin film calorimeter of claim 11 wherein said base substrate and said mask are made of phenolic material and/or fiberglass.

23. The thin film calorimeter test of claim 11 including locating pins between said base substrate and said mask.

24. The thin film calorimeter of claim 11 comprising a dual test platform thin film calorimeter test station including:
   an active test platform;
   a dummy test platform;
   an elongated base substrate;
   first and second heat flux sensing devices positioned on the test platforms;
   an elongated mask positioned above said first and second heat flux sensing devices; and
   said mask defining two spaced apart holes therethrough having a similar predetermined area.

25. The thin film calorimeter of claim 11 for measuring a factor of UV curability in heat per weight, e.g. joules per gram, from a of UV curable sample test material which is cured at a test station, said test station comprising:
   an electronic digital scale for weighing the UV curable test sample material;
   a test platform comprising the base substrate on said scale, and including upper and lower metal plates;
   a thermocouple positioned between said upper and lower metal plates; and
   a heat flux sensor positioned between said upper and lower metal plates and operatively connected to said thermocouple and to said upper and lower plates; and wherein the controller is coupled to the test platform and the electronic digital scale for electronically determining the heat per weight, e.g, joules per gram, from an exothermic reaction that takes place during the curing of the UV curable sample test material to provide a factor of UV curability.

26. A method for measuring a factor of ultraviolet (UV) curability of a UV curable material, comprising the steps of:
   placing the UV curable material on a heat flux sensing device;
   placing the heat flux sensing device on a thermal-conductive base positioned on a thermoelectric heater/cooler;
   heating or cooling the base using the thermoelectric heater/cooler to a predetermined temperature;
   directing UV light onto the UV curable material for a predetermined time period to cure the UV curable material while maintaining the predetermined temperature while also measuring at least one factor of curability.

27. The method according to claim 26, wherein the at least one factor of curability comprises measuring at least one of (1) the peak temperature generated by the exothermic reaction that takes place during curing of the UV curable material, (2) the time to peak curing temperature of the UV curable material; and (3) the total heat generated by the exothermic reaction that takes place during curing of the UV curable material.

28. The method according to claim 26, wherein the heat flux sensing device comprises a heat flux sensor positioned between at least two metal plates.

29. A method for measuring a factor of ultraviolet (UV) curability of a UV curable material, comprising the steps of:
   placing the UV curable material on a heat flux sensing device;
   placing a mask defining a hole with a predetermined area over the UV curable material;
   placing a transparent glass plate beneath the hole in the mask and above the UV curable material;
   placing water in the hole to filter out infrared (IR) and (UV) ultraviolet heat in UV light transmitted through the water to the UV curable material; and
   directing UV light through the hole onto the UV curable material beneath the hole in the mask for a predetermined time period to cure the UV curable material; while
   measuring at least one of (1) the peak temperature generated by the exothermic reaction that takes place during curing of the UV curable material, (2) the time to peak curing temperature of the UV curable material; and (3) the total heat generated by the exothermic reaction that takes place during curing of the UV curable material.

30. A method for measuring a factor of ultraviolet (UV) curability of a UV curable material, comprising the steps of:
   placing a piece of tape on a surface of a heat flux sensing device, whereby the piece of tape facilitates cleaning of the surface of the heat flux sensing device;
   placing the UV curable material on the piece of tape;
   flattening the UV curable material to a repeatable precise thickness;
   placing a mask defining a hole with a predetermined area over the UV curable material; and
   directing UV light through the hole onto the flattened UV curable material for a predetermined time period to cure the flattened UV curable material; while
   measuring at least one of (1) the peak temperature generated by the exothermic reaction that takes place during curing of the flattened UV curable material, (2) the time to peak curing temperature of the flattened UV curable material; and (3) the total heat generated by the exothermic reaction that takes place during curing of the flattened UV curable material.

31. A method for measuring a factor of ultraviolet (UV) curability of a UV curable material, comprising the steps of:
providing an electronic digital scale;
zeroing the scale with a test platform placed thereon, said test platform comprising a substrate and a heat flux sensing device comprising upper and lower metal plates with a thermocouple and a heat flux sensor sandwiched between the metal plates;
placing the UV curable material on the upper metal plate;
measuring the weight of the UV curable material placed on the upper metal plate of the heat flux sensing device;
exposing the UV curable material with UV light for a predetermined time period;
electronically measuring the heat flux through the heat flux sensing device;
electronically measuring the power per area per time, e.g. watts per meter squared per second; and
electronically determining the heat per weight e.g., joules per gram, from the exothermic reaction that takes place during the curing of the UV curable material as a factor of UV curability.

32. A thin film calorimeter for automatically determining a factor of ultraviolet (UV) curability of a UV curable sample test material, comprising:

a controller for electronically and automatically determining a peak curing temperature of the UV curable sample material, the time to reach the peak curing temperature of the UV curable sample material, and/or the total heat to cure the UV curable sample material;

a thin film calorimeter test station coupled to the controller, the test station comprising:

a base substrate;

a heat flux sensing device mounted on the base substrate, a mask defining a hole with a predetermined area positioned above the heat flux sensing device, a thickness control device for establishing a repeatable precise thickness layer of UV curable sample test material between the mask and the heat flux sensing device, wherein the thickness control device is a drawn down rod including a wire coil on a rod which is moved through the UV curable material and the thickness of the UV curable sample test material is determined by the diameter of the wire wound around the rod in the drawn down rod; and said UV curable sample test material selected from the group consisting of UV curable inks, a UV curable coating, and a UV curable adhesive.

* * * * *